United States Patent [19]
Brenner

[11] Patent Number: 5,517,800
[45] Date of Patent: May 21, 1996

[54] CONVEYOR WITH INTERMITTENT FLUID SUPPLY

[76] Inventor: Joseph H. Brenner, 185 Montclair Dr., Santa Cruz, Calif. 95060

[21] Appl. No.: 263,074

[22] Filed: Jun. 21, 1994

[51] Int. Cl.⁶ .................................................. B65B 51/04
[52] U.S. Cl. ...................... 53/473; 137/625.11; 53/243; 53/478
[58] Field of Search .................... 53/248, 473, 475; 406/86, 88; 137/625.11

[56] References Cited

U.S. PATENT DOCUMENTS

| | | | |
|---|---|---|---|
| 3,759,578 | 9/1973 | Muschelknautz et al. | 406/86 |
| 4,392,760 | 7/1983 | Futer | 406/88 |
| 4,553,566 | 11/1985 | Barclay et al. | 137/625.11 |
| 4,981,206 | 1/1991 | Franklin | 198/409 |
| 5,031,643 | 7/1991 | Hinz | 131/94 |
| 5,067,523 | 11/1991 | Fraioli | 137/625.41 |
| 5,209,387 | 5/1993 | Long et al. | 406/88 |
| 5,299,890 | 4/1994 | Spatafora et al. | 406/88 |
| 5,343,893 | 9/1994 | Hogan et al. | 137/625.11 |

*Primary Examiner*—John Sipos
*Assistant Examiner*—Gene L. Kim
*Attorney, Agent, or Firm*—Robert Samuel Smith

[57] ABSTRACT

A rotary valve including a housing with a cylindrical bore enclosing a rotatably mounted cylindrical tube. The cylinder has a first array of apertures and the housing has a second array of apertures. Each aperture of the first array aligns with an aperture of the second array once during a revolution of the cylinder so that pressurized fluid in the cylinder is ejected through the aligned apertures. The device has numerous applications such as in controlling the loading of transport tubes with fragile integrated circuit packages as well as in providing driving force in a conveyor system and distributing water in an irrigation system.

5 Claims, 2 Drawing Sheets

5,517,800

CONVEYOR WITH INTERMITTENT FLUID SUPPLY

BACKGROUND

1. Field of the Invention

This invention relates to devices operated by a plurality of intermittent fluid streams with particular application to a conveyor in which items are conveyed by spaced intermittent bursts of air.

2. Prior Art and Information Disclosure

Fluid streams of liquid or air are used in a number of diverse applications such as conveyors and irrigation systems.

For example, in application to conveyors, U.S. Pat. No. 5,031,643 to Hinz et al is for a pneumatic rotary conveyor for rod shaped articles disclosing a drum conveyor arranged to advance rod shaped objects (cigarettes) in a predetermined direction and an array of suction ports in the conveyor surface arranged to detachably secure the objects to the conveyor surface.

U.S. Pat. No. 4,981,206 to Franklin is for an apparatus for handling a package including a source of air that forces the package upward against a conveyor belt enabling the conveyor to transport the package.

Transport of integrated circuit devices (ICs) is an important operation in the manufacture and distribution of these devices. As a result of the huge quantity of ICs manufactured and tested throughout the world, the ICs are usually presented for testing by automatic handlers. The ICs are bulk stored in tubes or rails which are then emptied into the automatic handlers. Many of the more complex and expensive ICs are housed in ceramic packages with leads. After testing, the acceptable ICs are down loaded from the automatic handlers back into the tubes. Loading into tubes is done to facilitate movement of ICs from one operation to another.

When the ICs are loaded into the automatic handlers, frequently with a sloped gravitational feed, they collide with one another when they are stopped for the actual test operation. The collision oftentimes causes chipping of the edges of the ceramic packages. The chips are considered to be cosmetic (appearance) defects and cause the rejection (scrapping) of otherwise acceptable ICs. To minimize the occurrence of chipping, an operation called "singulation" (or slow down) is used to release the pans one at a time from the tubes. According to the present state of the art, singulation is performed by mechanical means such as with rollers or stop pins.

Valve bodies having a cylindrical cavity are disclosed for several applications. For example, U.S. Pat. No. 5,067,523 to Fraoli et al for a gas air controller unit discloses a valve body comprising a cylindrical chamber enclosing a hollow cylinder functioning as a mixing chamber. A source of gas and a source of air communicate with the mixing chamber through a respective opening in the chamber wall and cylinder when the openings are aligned by appropriate rotation of the hollow cylinder. The position of the cylinder and therefore the ratio of gas and air in the mixing chamber is controllable by a manually operated control knob coupled to the cylinder.

Drip irrigation for agricultural purposes is a process where control of a fluid stream is central to operation of the process. One of the problems in drip irrigation is to provide a uniform discharge of water from each nozzle located along the irrigation tube. As water flows continuously in the tube, pressure diminishes in proportion to the distance of the nozzle from the source of water so that rate of flow diminishes.

THE INVENTION

OBJECTS

It is an object of this invention to provide a means for supplying a plurality of intermittent fluid (gas or liquid) streams wherein the frequency of intermittency of the streams is controllable. In the context of this specification, the term "frequency of intermittency" is understood to mean that the streams are emitted periodically wherein the period between emission of any stream is controllable and the same as the periods between emissions of the other streams.

It is another object of this invention to apply the means for generating intermittent streams to convey objects at a controlled rate.

It is another object to apply the device for generating intermittent streams to convey objects in such a manner that the objects do not collide with one another and thereby avoid damaging the objects.

It is a particular object to avoid occurrence of chipping of ICs as frequently happens by loading the ICs into robes using gravity feed.

It is another object of this invention to broadcast fluid over a wide range of directions.

It is another object to apply the device in drip irrigation where it is desirable to maintain a constant rate of water issuing from each nozzle along the line.

SUMMARY

This invention is directed toward a rotary valve having a housing with a cylindrical bore and a hollow rotatable cylinder concentrically enclosed within the bore. The hollow cylinder is coupled at one end to a variable speed motor and at the other end to a source of pressurized fluid. An array of holes is provided in the housing and another array of holes is provided in the inner cylinder such that as the inner cylinder rotates, each hole in the housing is aligned with at least one of the holes in the cylinder during a period of one revolution of the cylinder.

In another embodiment, the inner cylinder is rotated under pressure from the fluid within the cylinder.

In one application, the device is used to provide a single source of pressurized air to a loader for loading ICs into a tube. Each IC is controlled by its own air stream such as to avoid collision with other ICs when the ICs are loaded into or out of a transporting tube by gravity feed.

In another application, the device of this invention is used as a conveying means for urging items along a conveyor line.

In another application, the device is used to broadcast water over a wide range of directions for example in an agriculture irrigation operation.

DRAWINGS

DESCRIPTION OF A PREFERRED MODE

The following description presents several variations, modifications and embodiments of the invention including what I presently believe to be the best mode for carrying out the invention.

Figure 1:
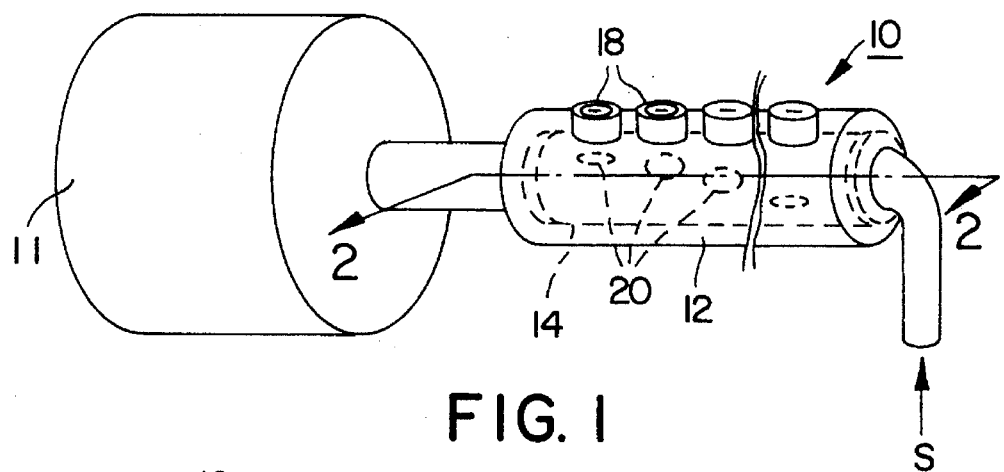
FIG. 1 shows in perspective the assembled rotary valve.
Figure 2:
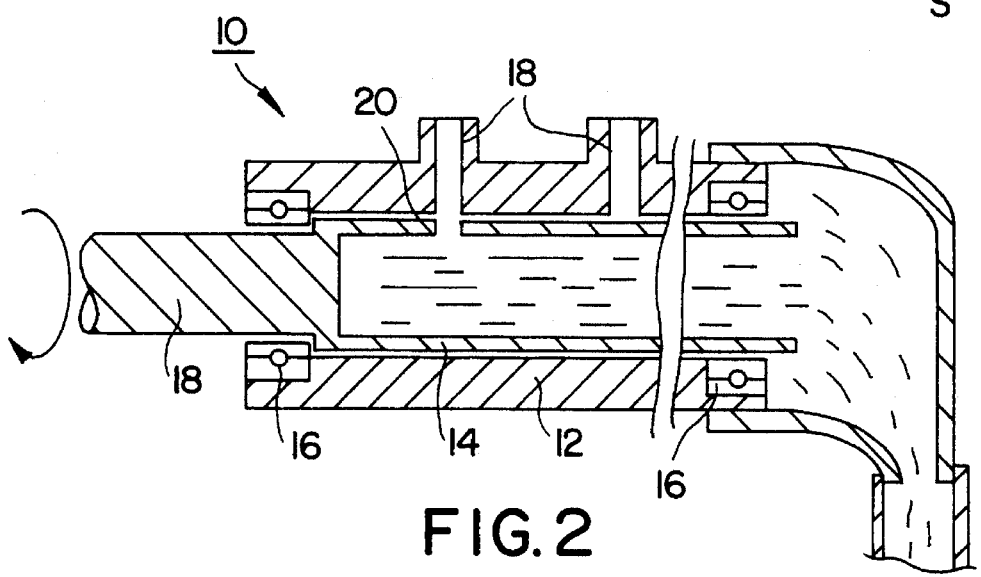
FIG. 2 is a sectional view of FIG. 1.
Figures 3, 4:
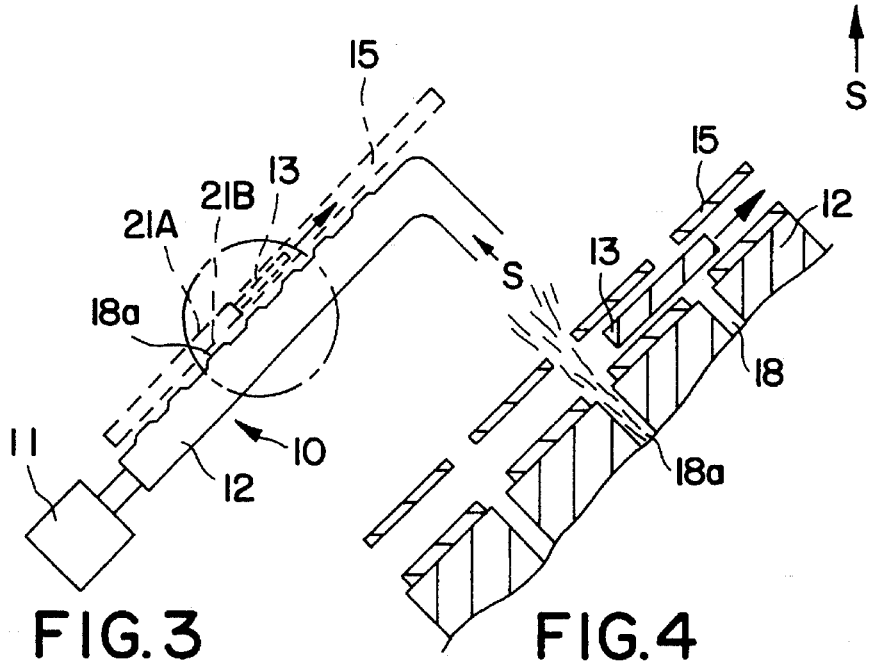
FIG. 3 shows the rotary valve positioned to load a transport tube for ICs.
FIG. 4 is a closer sectional view of FIG. 3.
Figure 5:
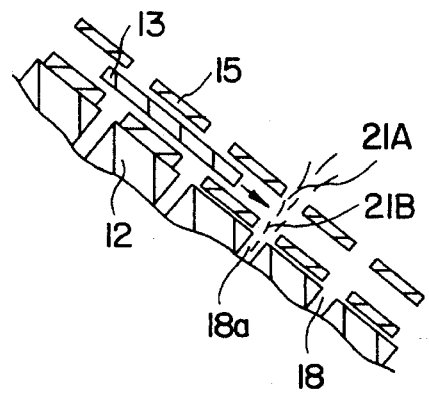
FIG. 5 is a cutaway sectional view illustrating the use of the rotary valve to control loading ICs into a transport tube by gravity feed.
Figure 6:
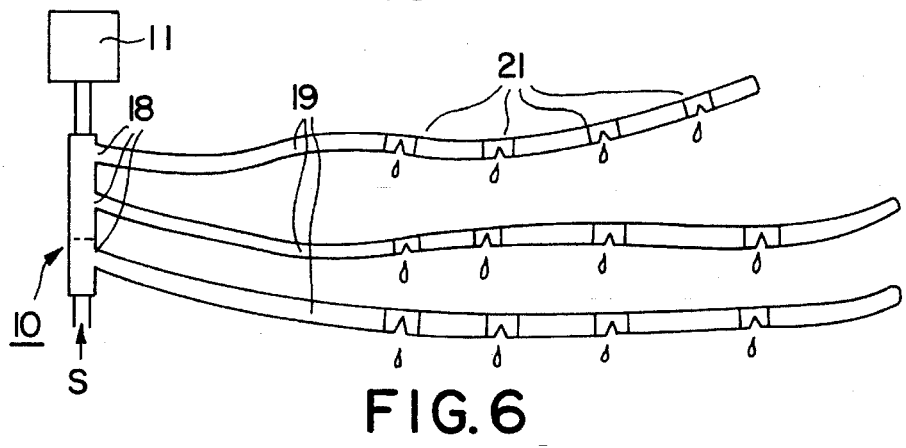
FIG. 6 shows the rotary valve used in drip irrigation.

Turning now to a discussion of the drawings, FIG. 1 is a perspective assembly view and FIG. 2 is a sectional view of a rotary valve 10 of this invention including a housing 12 with a cylindrical housing chamber enclosing a hollow cylinder 14. The cylinder 14 is shown in phantom in FIG. 1. and is journalled at each end by bearings 16 into the housing chamber 18. One end 18 of cylinder 14 extends out of the chamber of housing 12 and is coupled to a motor 11. The other end of the inner cylinder is open and communicates with a supply S of fluid (liquid or gas). Fluid supply is not shown. The housing 12 has an array of apertures 18 through its wall. The inner cylinder also has an array of apertures. In most applications, the housing and cylinder are constructred such that all of the housing apertures do not become aligned simultaneously with the apertures in the housing wall. The pattern of housing apertures and cylinder apertures are arranged such that, as the inner cylinder is rotated, each of the housing apertures 18 becomes aligned with the aperture in the cylinder enabling fluid inside the cylinder to issue from each aperture in succession. FIG. 3 illustrates an arrangement whereby the rotary valve 10 controls movement of an IC package 13 in a transport tube 15. FIG. 4 is a sectional enlarged cutaway view of FIG. 3 for the case where the IC is being conveyed upward into the tube 15 and FIG. 5 is a sectional cutaway view of FIG. 3 where the IC 13 is sliding downward into the tube 15. In FIG. 3, 4 and 5 air is shown passing through housing aperture 18A aligned with holes 21A and 21B in the tube so as to exert force on IC 13 thereby controlling the IC movement. FIG. 6 shows an arrangement whereby the rotary valve is used in a drip irrigation system. There are shown the rotary valve, 10 having each aperture 18 communicating with an irrigation line (Three apertures 18 and three irrigation lines 19 are shown in FIG. 6.) The rotary valve 10 provides pulses of water to each of irrigation lines 19. Each of lines 19 has a set of nozzles 21 which are preferably though not necessarily of the slit type of adjustable nozzle disclosed in U.S. Pat. No. 5,148,982 to Ekhoff. With each pulse, a pressure wave is propagated down the tube having an approximately constant amplitude (compared to the pressure gradient that occurs with steady flow) so that the rate of flow issuing from each nozzle is substantially independent of its distance from the rotary valve.

Figure 7:
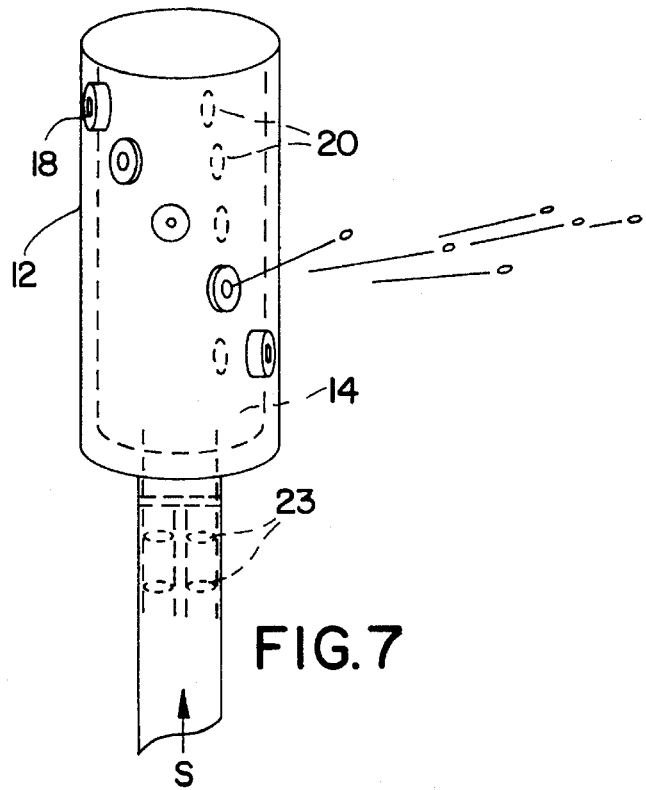
FIG. 7 shows the rotary valve used in a sprinkler system.

FIG. 7 shows the rotary valve in use to broadcast water over a broad area such as required for irrigation. Housing apertures 18 arrayed around housing 12 are shown and housing 12 enclosing cylinder 14 is shown in phantom. Cylinder 14 has cylinder apertures 20. In this embodiment, flow of fluid from source S turns the cylinder 14. This is accomplished by means of propellers 23 which are coupled to the cylinder 14.

In the foregoing paragraphs, a motor driven rotary valve has been described which has a number of applications in accordance with several embodiments of the invention. A major feature is a housing with housing apertures enclosing a rotating cylinder with cylinder apertures, each of which becomes aligned with one of the housing apertures at least once during a revolution of the inner cylinder. Application of the device to conveyors and irrigation systems has been disclosed. Other uses of the device are apparent after reading the specification and studying the drawings. I therefore wish to define my invention by the appended claims and in view of the specification if need be.

I claim:

1. A combination package loading and package apparatus which comprises:

a housing having a cylindrical housing wall defining a housing chamber and having a first array of housing apertures in said housing wall;

a hollow cylinder with an interior region and having a cylinder wall with a second array of cylinder apertures in said cylinder wall;

said cylinder rotatably mounted in said housing chamber and having an outside surface conforming to an interior surface of said housing chamber;

said second array of cylinder apertures operably arranged in combination with said first array of housing apertures such that, when said cylinder is rotated to a selected number of orientations, one of said cylinder apertures is aligned with a respective one of said housing apertures;

a means adaptable for connection to a drive means for rotating said cylinder, said connecting means coupled through said housing wall to a first end of said cylinder;

means for said interior region to communicate with a source of pressurized gas;

a transport tube means for transporting objects and having a tube wall with a straight row of tube apertures in said tube wall and positioned such that each tube aperture is aligned with one of said housing apertures whereby an interior of said tube communicates with said interior region when a cylinder aperture is aligned with one of said housing apertures;

said array of cylinder and housing apertures arranged such that each said cylinder aperture is aligned with a respective one of said housing apertures, one cylinder aperture after another as said cylinder is rotated and adapted for providing that an object in said tube interior is urged by fluid pressure from said cylinder interior region to move from one end of the transport tube to the other end.

2. A method for packaging a plurality of objects for transport which comprises:

(a) providing a rotary valve which comprises:

(i) a housing having a cylindrical housing wall defining a housing chamber and having a first array of housing apertures in said housing wall;

(ii) a hollow cylinder with an interior region and having a cylinder wall with a second array of cylinder apertures in said cylinder wall;

(iii) said cylinder rotatably mounted in said housing chamber and having an outside surface conforming to an interior surface of said housing chamber;

(iv) said second array of cylinder apertures operably arranged in combination with said first array of housing apertures such that, when said cylinder is rotated to a selected number of orientations, one of said cylinder apertures is aligned with it respective one of said housing apertures;

(v) a means adaptable for connection to a drive means for rotating said cylinder, said connecting means coupled through said housing wall to a first end of said cylinder;

(vi) means for said interior region to communicate with a source of fluid;

(vii) a tube having a wall with a row of holes extending in a long direction of said tube, said tube and housing operably arranged such that each one hole of said row of holes is aligned with one of said housing apertures, respectively {b} applying a stream of air into said cylinder and rotating said cylinder whereby a stream of air passes through each said hole one after another beginning with the hole nearest said open end;

(c) introducing each object into an open first end of said tube such as to urge said introduced object from said first end toward a second end of said tube.

3. A method as in claim 2 wherein said objects are integrated circuit packages.

4. A method for packaging a plurality of objects for transport a said tube has a row of holes extending from a first open end which comprises:

tilting said tube to an orientation wherein an open end is higher than a closed end such that an object introduced into said open end would slide toward said closed end;

applying a stream of air to each said hole in succession one after another beginning with a hole nearest said open end such as to restrain an object placed in said open end from free falling to said closed end;

introducing each object one at a time in said open end thereby allowing each said object to descend to said closed end controlled by said succession of air streams.

5. A method as in claim 4 wherein each said object is an integrated circuit.

* * * * *